O. M. RYGH.
FASTENER.
APPLICATION FILED MAR. 22, 1921.
1,438,264.
Patented Dec. 12, 1922.
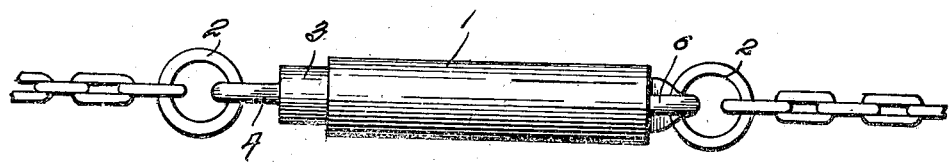
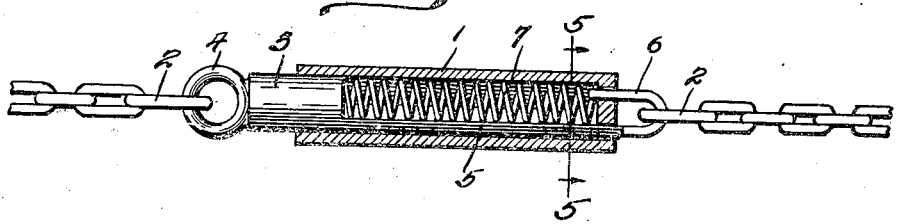
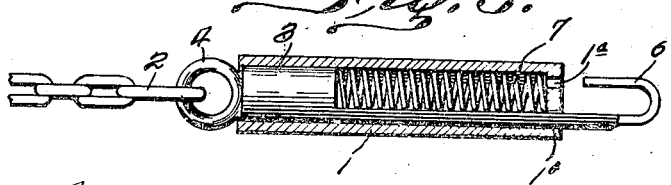
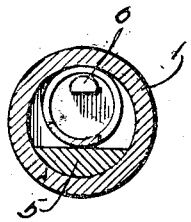
Inventor
O. M. Rygh.
By G. B. McBath
Attorney Patented Dec. 12, 1922.

1,438,264

UNITED STATES PATENT OFFICE.

OLAF M. RYGH, OF MINNEAPOLIS, MINNESOTA.

FASTENER.

Application filed March 22, 1921. Serial No. 454,334.

*To all whom it may concern:*

Be it known that I, OLAF M. RYGH, a citizen of Norway, residing at Minneapolis, in the county of Hennepin and State of Minnesota, have invented certain new and useful Improvements in Fasteners, of which the following is a specification.

This invention relates to a fastener designed more especially for use in connection with necklace chains, and similar articles, the object being to provide a fastener which cannot be opened while there is any pull or strain on the chain. In many cases a fastener is employed in which the chain ends are detached by a pull on the chain, this being especially the case with device of the snap button order. Any accidental pull on the chain, or one, by an unauthorized person will of course unlock such fastener. With my device the fastener cannot be released by such pull, either from the chain catching on some other object, or from some one catching hold of it, as any pull on the chain locks it all the more securely. This fastener may also be regarded as a loss preventing device.

The invention consists in the novel features of construction hereinafter described, pointed out in the claim and shown in the accompanying drawings, in which:

Figure 1 is a side elevation of the fastener, two ends of the chain being shown secured thereto and with the parts in locked position.

Figure 2 is a view of the parts shown in Figure 1 a sleeve being in section.

Figure 3 is a sectional view similar to Figure 2, the fastener being in open position and a chain end detached.

Figure 4 is a perspective view of a combined plunger and hook, removed from the sleeve.

Figure 5 is a section on the line 5—5 of Figure 2.

In the drawings 1 designates a sleeve open at one end, and its closed end being provided with an aperture $1^a$ and a slot $1^b$. The ends of the chain or other article the ends of which are to be secured together are provided with rings 2. Working in the sleeve is a combined plunger and hook, this comprising a plunger portion 3 which works in the open end of the sleeve and carries at its outer end an eye 4 to which one of the rings 2 is permanently secured, extending from the inner end of the plunger and through the sleeve is a bar 5, which bar works in the slot $1^b$. The outer end of the bar is reduced in size and bent back upon itself to form a hook 6, the hook being adapted to engage and co-operate with the aperture $1^a$, and to be engaged by the remaining ring 2. A spring 7 is inserted in the sleeve bearing at one end on the end of the sleeve, and at the opposite end against the plunger 3. Normally this spring will force the plunger outwardly thereby holding the hook in the aperture $1^a$ and preventing disengagement of the ring 2 engaging said hook. Any pull on the right hand side of the chain is resisted by the spring, and any pull or strain on the left hand side will seat the hook more firmly in the sleeve end. No pull on the chain can accidentally unfasten the device for the reason that while a pull on the right hand side would draw the plunger inwardly and withdraw the hook from the aperture in the sleeve end the same pull would draw and hold the ring 2 in the bow portion of the hook 6. The ring can be disengaged only when this end of the chain is slack, and no pull on the chain can release the ring, but on the contrary will lock it the more tightly in place.

The device can however be readily opened for release of the chain by pressure of the thumb on the plunger 3.

What I claim is:—

A fastener of the kind described comprising a sleeve open at one end and having its opposite end slotted and apertured, a plunger working in the open end of the sleeve, a bar integral with the plunger and extending through the sleeve and working in the slot, and a hook carried by the bar, the free end of the hook normally passing through the aperture and lying within the sleeve.

In testimony whereof I affix my signature.

OLAF M. RYGH